(12) United States Patent
Lee et al.

(10) Patent No.: US 10,271,358 B2
(45) Date of Patent: Apr. 23, 2019

(54) METHOD AND DEVICE FOR SERVICE NEGOTIATION

(71) Applicant: Samsung Electronics Co., Ltd., Suwon-si, Gyeonggi-do (KR)

(72) Inventors: Taeyoung Lee, Seoul (KR); Jaeeun Kang, Suwon-si (KR); Hansu Kang, Seoul (KR); Bongjhin Shin, Suwon-si (KR); Chilyoul Yang, Anyang-si (KR); Myounghwan Lee, Suwon-si (KR); Chunho Lee, Suwon-si (KR); Jihye Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 14/317,725

(22) Filed: Jun. 27, 2014

(65) Prior Publication Data
US 2015/0004908 A1 Jan. 1, 2015

(30) Foreign Application Priority Data
Jul. 1, 2013 (KR) .................. 10-2013-0076641

(51) Int. Cl.
*H04B 5/00* (2006.01)
*H04W 76/10* (2018.01)
*H04W 76/14* (2018.01)

(52) U.S. Cl.
CPC ........... *H04W 76/10* (2018.02); *H04W 76/14* (2018.02)

(58) Field of Classification Search
CPC . H04W 36/0066; H04W 36/14; H04W 88/06; H04W 48/16; H04W 76/023;
(Continued)

(56) References Cited

U.S. PATENT DOCUMENTS 6,892,052 B2 5/2005 Kotola et al.
9,813,497 B2 * 11/2017 Mallik .................. H04W 8/005
(Continued)

FOREIGN PATENT DOCUMENTS

EP 2 541 800 A2 1/2013
KR 10-2009-0030141 A 3/2009

*Primary Examiner* — Ajibola A Akinyemi
(74) *Attorney, Agent, or Firm* — Jefferson IP Law, LLP

(57) ABSTRACT

A method and an electronic device for service negotiation are provided. The method includes sensing, by the electronic device, a counterpart device through a first protocol, transmitting a request message to the counterpart device through the first protocol, the request message including indication information indicating that the electronic device requests a first service and first service information regarding the first service, and connecting with the counterpart device through a second protocol, when a selection message including indication information selecting the first service is received from the counterpart device through the first protocol, and, after connecting through the second protocol, executing the first service with the counterpart device using the first service information. The request message and the selection message each includes connection information for a connection using the second protocol, and the electronic device and the counterpart device use the connection information to perform the connection using the second protocol.

17 Claims, 10 Drawing Sheets

(58) Field of Classification Search
CPC ..... H04W 8/005; H04W 36/16; H04W 36/24; H04W 4/046; H04W 4/22; H04W 76/007; H04W 76/028; H04W 80/00; H04W 84/12; H04W 4/16; H04W 4/20; H04W 72/04; H04W 72/12
USPC ........................................................ 455/41.1
See application file for complete search history.

(56) References Cited

U.S. PATENT DOCUMENTS

| | | |
|---|---|---|
| 2007/0141984 A1 | 6/2007 | Kuehnel et al. |
| 2009/0077241 A1 | 3/2009 | Choi et al. |
| 2009/0111378 A1* | 4/2009 | Sheynman ............ H04W 8/005 455/41.1 |
| 2010/0081385 A1 | 4/2010 | Lin et al. |
| 2011/0213876 A1 | 9/2011 | Kumar et al. |
| 2011/0275316 A1* | 11/2011 | Suumaki ............ G06K 7/10237 455/41.1 |
| 2011/0281557 A1* | 11/2011 | Choi .................... H04L 63/0853 455/411 |
| 2013/0005263 A1* | 1/2013 | Sakata .................. H04W 76/18 455/41.2 |
| 2014/0256365 A1* | 9/2014 | Schmidt ................. H04W 4/90 455/466 |

* cited by examiner

METHOD AND DEVICE FOR SERVICE NEGOTIATION

CROSS-REFERENCE TO RELATED APPLICATION(S)

This application claims the benefit under 35 U.S.C. § 119(a) of a Korean patent application filed on Jul. 1, 2013 in the Korean Intellectual Property Office and assigned Serial number 10-2013-0076641, the entire disclosure of which is hereby incorporated by reference.

TECHNICAL FIELD

The present disclosure relates to a method and a device for service negotiation.

BACKGROUND

Near Field Communication (NFC) refers to a non-contact-type short-range (10 cm) wireless communication technology using a frequency band of 13.56 MHz. The NFC technology can be diversely applied in the next-generation ubiquitous environment, and use of this technology can support high-speed communication between devices including smart phones, digital cameras, Personal Digital Assistants (PDAs), etc.

Previously adopted NFC utilization schemes support, through an NFC, exchange of connectivity information for connectivity of carriers, such as WiFi and Bluetooth. However, information exchange processes after WiFi/Bluetooth connection have been neither determined nor known, which inconveniences users.

FIG. 1 illustrates connectivity handover of an NFC forum according to the related art.

According to existing connectivity handover standards of the NFC forum, a handover request/selection message solely includes information regarding connectivity of carriers such as WiFi/Bluetooth, etc. This is inconvenient because, after connection, the user needs to manually execute a desired service.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method for transmitting/receiving information related to service execution using NFC or any other short-range communication.

In accordance with an aspect of the present disclosure, a method of service negotiation by an electronic device is provided. The method includes sensing, by the electronic device, a counterpart device through a first protocol, transmitting a request message to the counterpart device through the first protocol, the request message including indication information indicating that the electronic device requests a first service and first service information regarding the first service, and connecting with the counterpart device through a second protocol, when a selection message including indication information selecting the first service is received from the counterpart device through the first protocol, and, after connecting through the second protocol, executing the first service with the counterpart device using the first service information. The request message and the selection message may each include connection information for a connection using the second protocol, and the electronic device and the counterpart device may use the connection information to perform the connection using the second protocol. When a communication module included in the counterpart device is powered off or deactivated, the request message may include content that switches the communication module to an activated state (communication module on). The service negotiation method may further include transmitting a message requesting that the communication module switch to an activated state, when the communication module of the counterpart device is powered off or deactivated. In this case, the communication module may perform communication through at least one of protocols such as Wi-Fi, BT, LTE, and WCDMA.

In accordance with another aspect of the present disclosure, a method of service negotiation by an electronic device is provided. The method includes sensing, by the electronic device, a counterpart device through a first protocol, receiving a request message from the counterpart device through the first protocol, the request message including at least one of request indication information indicating a service requested by the counterpart device and available indication information indicating a service that can be supported by the counterpart device, and establishing a connection with the counterpart device through a second protocol, when service execution is determined based on the request indication information, the available indication information, and a service requested or supported by the electronic device, and, after establishing the connection with the counterpart device, executing the service, an execution of which has been determined, through the second protocol. The request message may include connection information for a connection using the second protocol, and the electronic device and the counterpart device may use the connection information to perform the connection using the second protocol. The service negotiation method may further include, when a communication module included in the counterpart device is deactivated (off), requesting activation of the communication module.

In accordance with another aspect of the present disclosure, an electronic device of service negotiation is provided. The electronic device includes a communication unit configured to sense a counterpart device through a first protocol and to transmit a request message to the counterpart device through the first protocol, the request message including indication information indicating that the electronic device requests a first service and first service information regarding the first service, and a controller configured to connect with the counterpart device through a second protocol, when a selection message including indication information selecting the first service is received from the counterpart device through the first protocol, and, after connecting through the second protocol, execute the first service with the counterpart device using the first service information. The request message and the selection message may each include connection information for a connection using the second protocol, and the electronic device and the counterpart device may be configured to use the connection information to perform the connection using the second protocol.

In accordance with another aspect of the present disclosure, an electronic device of service negotiation is provided. The electronic device includes a communication unit configured to sense a counterpart device through a first protocol, receive a request message from the counterpart device through the first protocol, the request message including at least one of request indication information indicating a service requested by the counterpart device and available indication information indicating a service that can be supported by the counterpart device, and a controller configured to establish a connection with the counterpart device through a second protocol, when service execution is determined based on the request indication information, the available indication information, and the service requested or supported by the electronic device, and, after establishing the connection with the counterpart device, to execute the service, an execution of which has been determined, through the second protocol. The request message may include connection information for a connection using the second protocol, and the electronic device and the counterpart device may be configured to use the connection information to perform the connection using the second protocol.

An embodiment of the present disclosure can provide an electronic device and a method for transmitting/receiving information related to service execution using NFC or any other short-range communication.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following detailed description taken in conjunction with the accompanying drawings, in which.

Throughout the drawings, it should be noted that like reference numbers are used to depict the same or similar elements, features, and structures.

DETAILED DESCRIPTION

Figure 1:
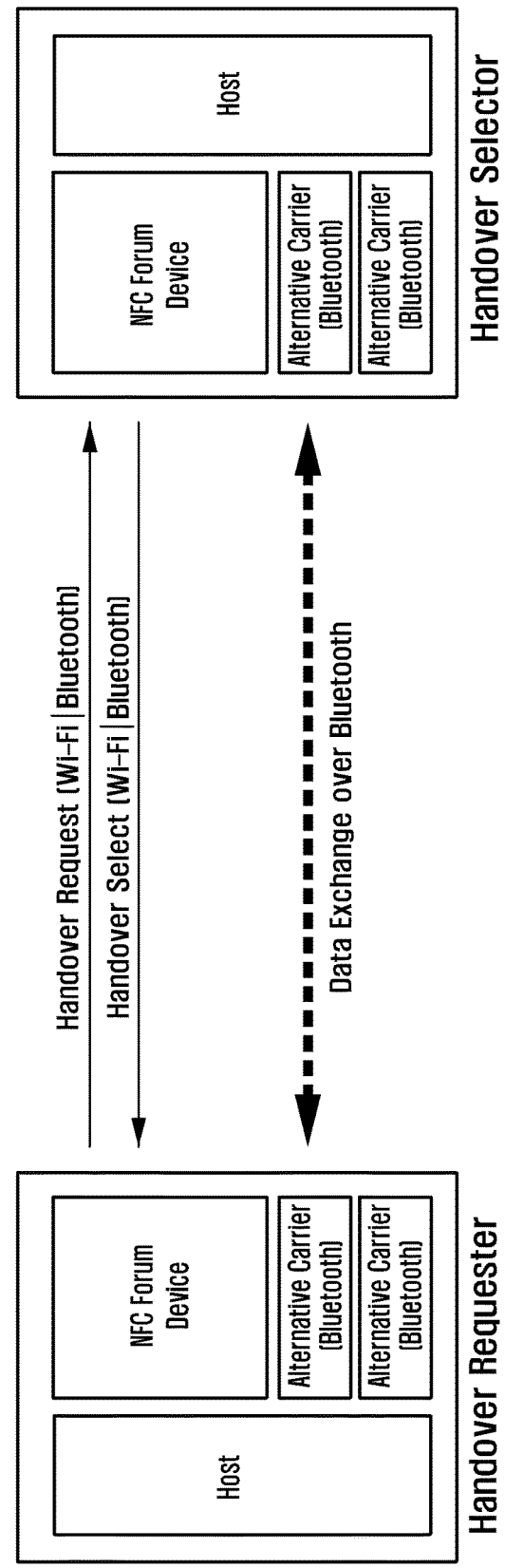
FIG. 1 illustrates connectivity handover of an NFC forum according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In describing the embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

When tagging is performed using NFC, schemes can only transmit information for WiFi/and/or Bluetooth connectivity unidirectionally, or the counterpart device can simply execute an application. No method has been known to be used for transmitting information regarding a service that can be executed after connection using a carrier, such as WiFi/Bluetooth, when two devices have been tagged using NFC. Therefore, there is even no knowing what kind of service the counterpart device supports, and the only operation possible is to send a message unidirectionally and execute an application.

Related schemes have a problem in that, when services supported by the counterpart device are known, after WiFi/Bluetooth connection, not to include the desired service, resources of the electronic device have been wasted to unnecessarily establish the WiFi/Bluetooth connection.

Hereinafter, service triggering based on service negotiation will be described.

FIGS. 2 through 10, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

According to an embodiment of the present disclosure, two devices can exchange, besides connectivity information, additional information for executing a service after connection with each other through NFC tagging, negotiate a service that is to be executed by the two devices, and execute the service.

Figure 2:
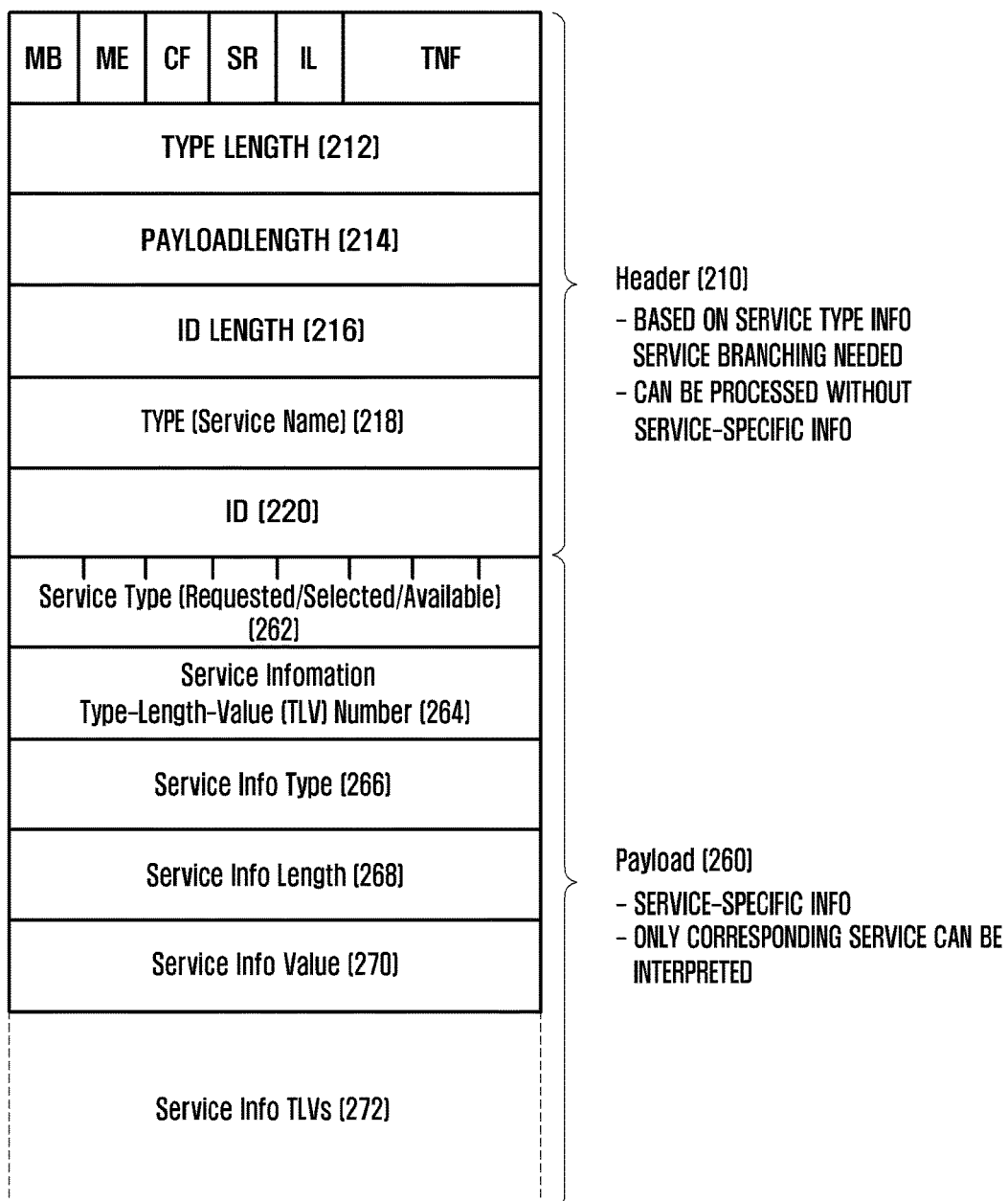
FIG. 2 illustrates a structure of a data unit according to an embodiment of the present disclosure.

FIG. 2 illustrates a structure of a data unit according to an embodiment of the present disclosure.

The data unit illustrated in FIG. 2 is an example of a data structure for transmitting/receiving information for service execution after connection. The information for executing a service after connection can be defined using a record format of NFC Data Exchange Format (NDEF). The data unit of FIG. 2 will hereinafter be referred to as a record. Information for executing a service will be referred to as service-related information. A record containing service-related information will be referred to as a service record. For example, a record may include a Type Name Format (TNF) field, a Message Beginning (MB) field, a Message End (ME) field, a Chunk Field (CF), a Short Record (SR) field and/or an ID Length (IL) field.

Referring to FIG. 2, a record, according to an embodiment of the present disclosure, including a header 210 and a payload 260 is illustrated. The payload 260 includes information for executing a service, such as, for example, service specific information where only a corresponding service can be interpreted. The header 210 includes information for identifying the service type, etc., and, for example, is based on service type information, and needed service branching and can be processed without service specific information.

An embodiment proposes, in order to help understanding, a record type similar to a handover request/selection message. Processes of service negotiation and triggering can be performed by exchanging the service record. Service negotiation and triggering can be performed by exchanging a service record using a general NDEF message.

The header 210 includes a type length field 212, a payload length field 214, an ID length field 216, a type field 218, and an ID field 220. The type length field 212 indicates a length of the type field 218. The payload length field 214 indicates a length of the payload 260. The ID length field 216 indicates a length of the ID field 220. The type length field 214 indicates a length of the type field 220. The ID field 216 includes an identifier of the corresponding record or any other identification information necessary for identification of the corresponding record.

Particularly, the type field 218 includes a service indicator (e.g., service name) that indicates to what service the exchanged information is related. For example, when information indicating service execution is included in the payload 260 and exchanged, the type field 218 may include an indicator that identifies the information. The type field 218 may also indicate a specific application for which the corresponding information is used.

The payload 260 includes a service type field 262, a service information TYPE-LENGTH-VALUE (TLV) number field 264, and service information TLVs 266, 268, 270, 272.

The service type field 262 can be set to indicate, for example, one of a requested type, a selected type, and an available type. The service type field indicates the attribute or usage of information included in the service information TLVs.

When the service type field 262 is set to indicate the requested type, service information included in the payload 260 must include information regarding particulars requested by the message sender. The transmitting device can, in order to deliver information regarding particulars requested by the transmitting device, set the service type field 262 to indicate the requested type and set the service information TLV to indicate content regarding the requested particulars.

When the service type field 262 is set to indicate the selected type, service information included in the payload 260 must include a response to the requested type message from the counterpart. That is, service information includes information enabling identification of an available item among particulars requested by the counterpart and/or a preferred/selected item among particulars requested by the counterpart. The transmitting device can, in order to deliver information regarding particulars selected by the transmitting device, set the service type field 262 to indicate the selected type and set the service information TLV to indicate content regarding requested particulars.

When the service type field 262 is set to indicate the available type, service information included in the payload 260 must include information regarding service items that can be executed by the transmitting device. The transmitting device can, in order to deliver information regarding service items that can be executed by the transmitting device, set the service type field 262 to indicate the available type and set the service information TLV to indicate content regarding available items.

The receiving device analyzes the payload 260 of the received record, grasps the type and role of information indicated by the service information TLV of the payload 260, according to what the service type field 262 is, and accordingly processes the service information TLV.

The service information TLV is composed of a service information type field 266, a service information length field 268, and a service information value field 270. The payload 260 may include a plurality of such service information TLVs. The service information TLV number field 264 indicates the number of service information TLVs. The receiving device can grasp information, which is indicated by the value included in the service information value field 270, using the service information type field 266 and the service information length field 268. The transmitting device sets the service information type field 266 according to the type of information items to be transmitted, records the length of the to-be-transmitted information item value in the service information length field 268, and records the corresponding information value in the service information value field 270.

The record structure described with reference to FIG. 2 is only an embodiment, and a different data structure of a similar type can also be used. An embodiment of the present disclosure needs delivery of the type field 218, which indicates that the record is related to service negotiation, and information for service execution. Other fields may play auxiliary roles to deliver the above-mentioned information. The TLV structure or other type fields and length fields may be omitted when a fixed length field is used or when a separate type field is unnecessary.

Figure 3:
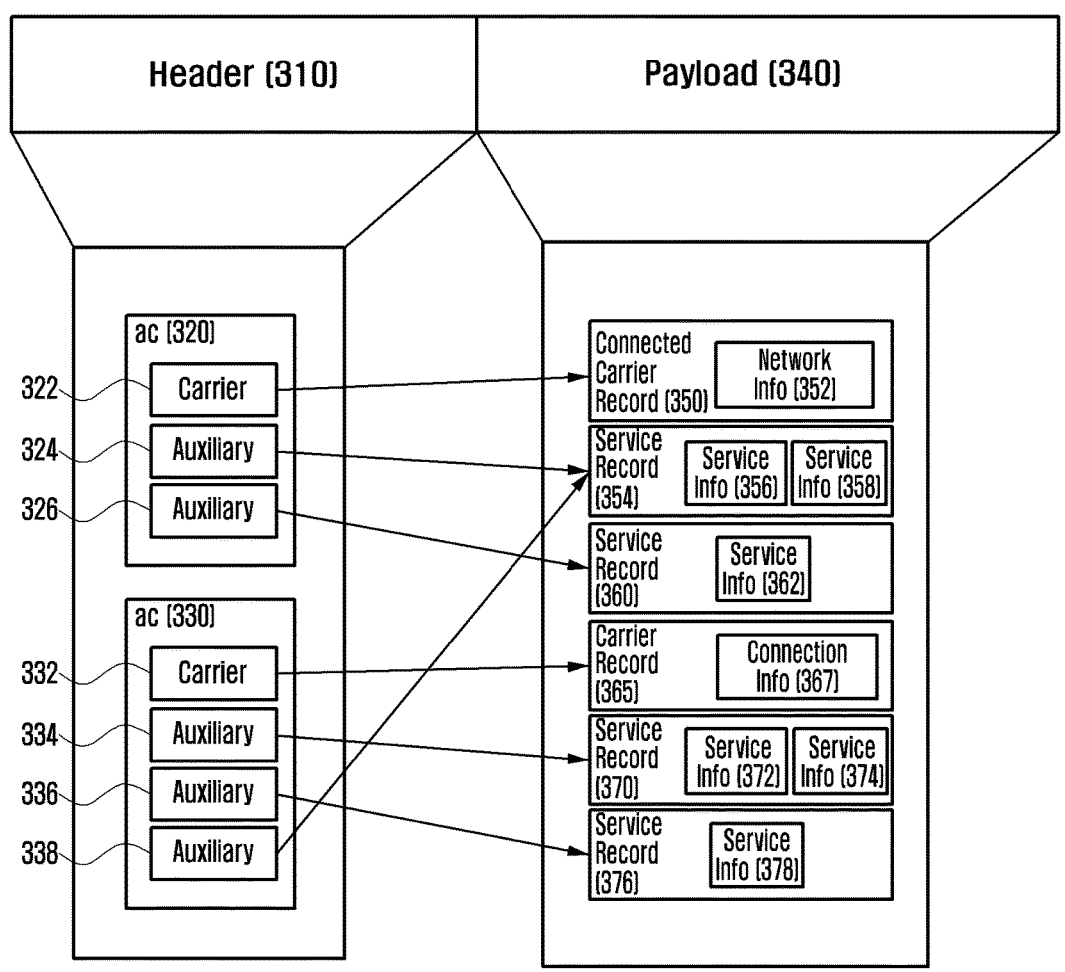
FIG. 3 illustrates a data structure according to an embodiment of the present disclosure.

FIG. 3 illustrates a data structure according to an embodiment of the present disclosure.

The data structure of FIG. 3 is obtained by partially modifying an NFC handover request/selection message configuration.

Referring to FIG. 3, a header 310 and a payload 340 are illustrated. The payload 340 may include a plurality of data units of FIG. 2. A message for service automatic execution after establishment of connection can be transmitted using the data unit of FIG. 3. The data unit of FIG. 3 includes a structure for delivering the data unit of FIG. 2.

Referring to FIG. 3, the header 310 includes Alternative Carriers (AC) 320, 330. The AC 320 includes a carrier field 322 and auxiliary fields 324, 326. The AC 330 includes a carrier field 332 and auxiliary fields 334, 336, 338. The carrier fields 322, 332 and auxiliary fields 324, 326, 334, 336, 338, which are included in the header 310, are index fields and/or reference fields indicating records included in the payload 340. As described with reference to FIG. 2, each service record has an ID field 220. The corresponding ID field is an identifier that identifies a service record. It is possible to indicate information regarding a service, which is to be executed after connection of a specific carrier, by recording the ID of a service record in the carrier fields 322, 332 and/or the auxiliary fields 324, 326, 334, 336, 338.

For example, the carrier field 322 of the AC 320 indicates a carrier record 350, and the auxiliary fields 324, 326 indicate service records 354, 360. That is, after a carrier corresponding to the AC 320 is connected, a service can be executed according to information included in a network information field 352, which is included in the carrier record 350, and in service information fields 356, 358, 362, which are included in the service records 354, 360.

The payload 340 includes (connected) carrier records 350, 365 and service records 354, 360, 370, 376. Each of the service records 354, 360, 370, 376 is composed of a data unit as illustrated in FIG. 2. At least a part of service information 356, 358, 362, 372, 374, 378 included in each record may have a service record structure described with reference to FIG. 2. However, network information 352 and connection information 367, which are included in the carrier records 350, 365, may include information for connection of at least one of mobile communication protocols such as Wireless Fidelity (Wi-Fi), Bluetooth, Long Term Evolution (LTE), Wideband Code Division Multiple Access (WCDMA), and Global System for Mobile (GSM). That is, after connection is made using a carrier record, a corresponding service record can be used to define/negotiate operations after the connection. In addition, although a process of connection of Wi-Fi, Bluetooth, etc. using NFC has been described as an example, the present disclosure is not limited thereto, but also includes cases of connection of Wi-Fi, Bluetooth, etc. using 3G/4G networks. That is, the Wi-Fi module of a device at a remote site may be activated (corresponding to a case in which it is deactivated) using an already-connected 3G/4G mobile communication protocol, connectivity information for connecting to a Wi-Fi AP near the device at a remote site may be transmitted to the device at a remote side, and a series of processes necessary for Wi-Fi connection may be performed. Such an embodiment has the following meaning: it may be for the purpose of helping a user, who is not used to device manipulation, conduct processes for Wi-Fi connection, or for the purpose of control of a user device at a remote site. It is also possible to deliver connectivity information using a 3G/4G network for the purpose of connection with a counterpart device positioned in a local area, not a device at a remote site.

Figure 4:
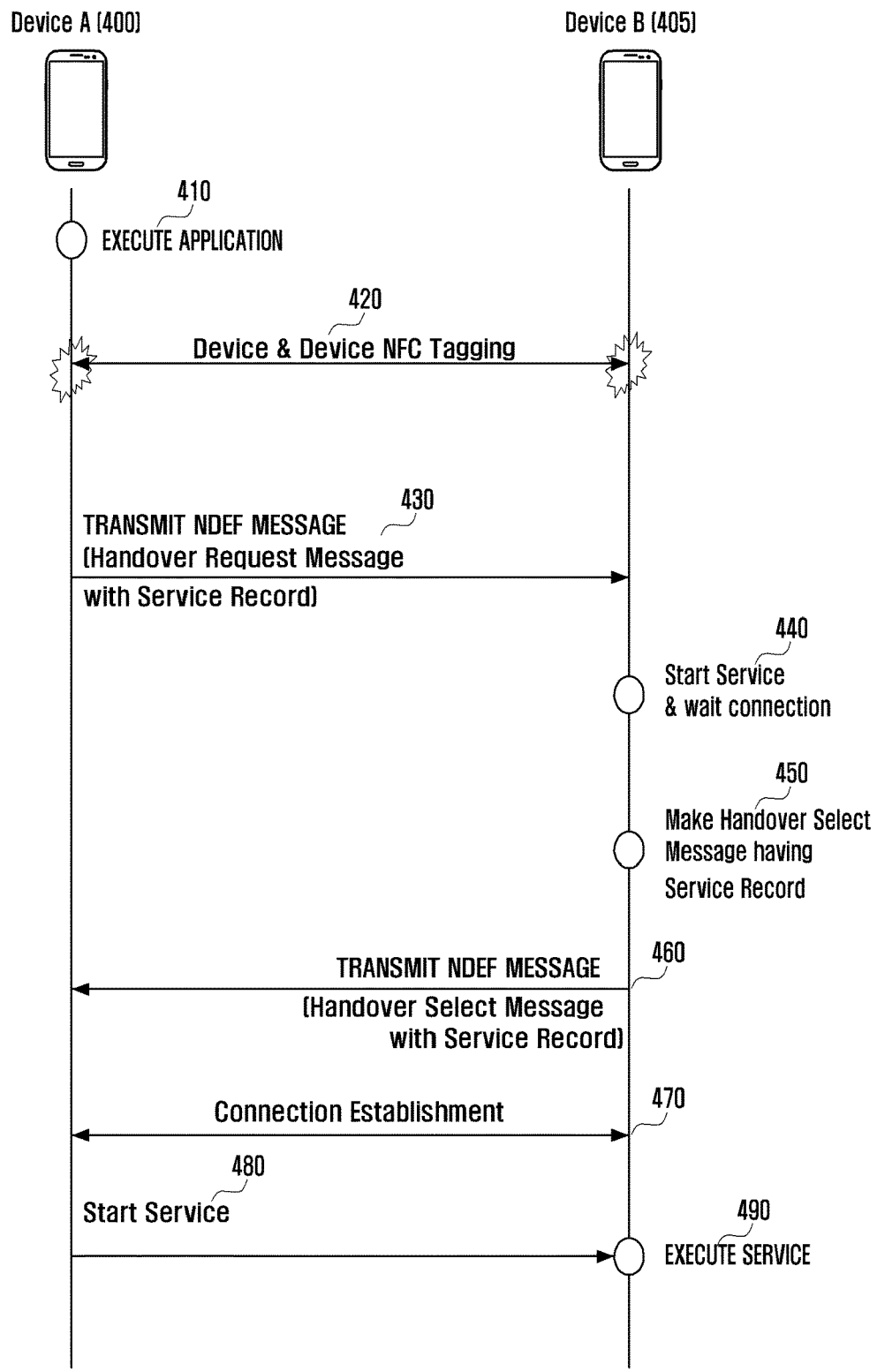
FIG. 4 is a flowchart of a service negotiation process according to an embodiment of the present disclosure.

FIG. 4 is a flowchart of a service negotiation process according to an embodiment of the present disclosure.

Referring to FIG. 4, a service negotiation between a device A 400 and a device B 405 as performed is illustrated.

In operation 410, the device A 400 executes an application. The corresponding application can be executed by the user's input, or arrival of a preset time, booting of a device, and/or any other event.

In operation 420, NFC tagging between the device A 400 and the device B 405 is performed. As the NFC tagging process, a known scheme, or a scheme modified based on later standard updates may be used.

When the tagging is completed, the device A 400 transmits a (handover) request message (e.g., a NDEF message) to the device B 405 in operation 430. The request message may have a format the same as or similar to the configuration of FIG. 3. Specifically, the request message includes a service record. The service type field 262 of the payload of the first service record, which is included in the request message, is set to indicate the requested type, and the payload of the first service record includes information regarding service items requested by the device A 400. The service type field 262 of the payload of the second service record, which is included in the request message, is set to indicate the available type, and the payload of the second service record includes information regarding service items that can be supported (available) by the device A 400.

In operation 440, a device B 405 starts a service and starts connection standby. In operation 450, the device B 405 generates a handover message having a service record. When the request message of operation 430 includes a service record (request record), the service type of which is the requested type, the device B 405 can select a service item, which the device B 405 can support, from service items requested by the request record and transmit the selected message to the device A 400. In this case, the service name of the service record of the selected message may be set to be the same as the service name of the request record delivered in operation 430. The service type of the service record of the selected message may be set to indicate the selected type. The selected message may include information regarding whether the requested service can be executed or not and other relevant information necessary for service execution.

In addition, the device B 405 may separately have a service that it wants to request (preferred service) according to the user's setting, other events, etc. When a service record, the service type of which is the available type (available record), exists in the request message transmitted by the device A 400, the device B 405 may add information regarding the service, which it wants to request, to the service record to be transmitted and set the service type of the to-be-transmitted service record to indicate the requested type. The device B 405 may set the service type of the service record to indicate the requested type, generate a service record, which includes information regarding the service it wants to request, and transmit a selection message, which includes the corresponding service record, to the device A 400.

In operation 460, the device B 405 transmits the handover selection message (e.g., the NDEF message), which has been generated in operation 450, to the device A 400.

In operation 470, the device A 400 and the device B 405 establish connection based on information (similar to a conventional NFC handover message) exchanged at the above-mentioned operation. In operations 480 and 490, a service after connection can be performed based on information exchanged through the above-mentioned service records (e.g., a start service operation and an execute service operation).

Examples of messages transmitted/received in FIG. 4 are given below:

Operation 430: a device A transmits a message; the service record is as given below:
Service name: File Transfer Protocol (FTP) service
Service type: requested type
Service information TLV: "Wants to be a server, my connection information is . . . "

A device B receives the message of operation 430, and transmits a message in operation 460; the service record is as given below:
Service name: FTP service
Service type: selected type
Service information TLV: "Good. Available. Will connect."

Through the above-mentioned process, an operation, e.g. FTP connection between the two devices 400, 405, can be performed automatically.

Figure 5:
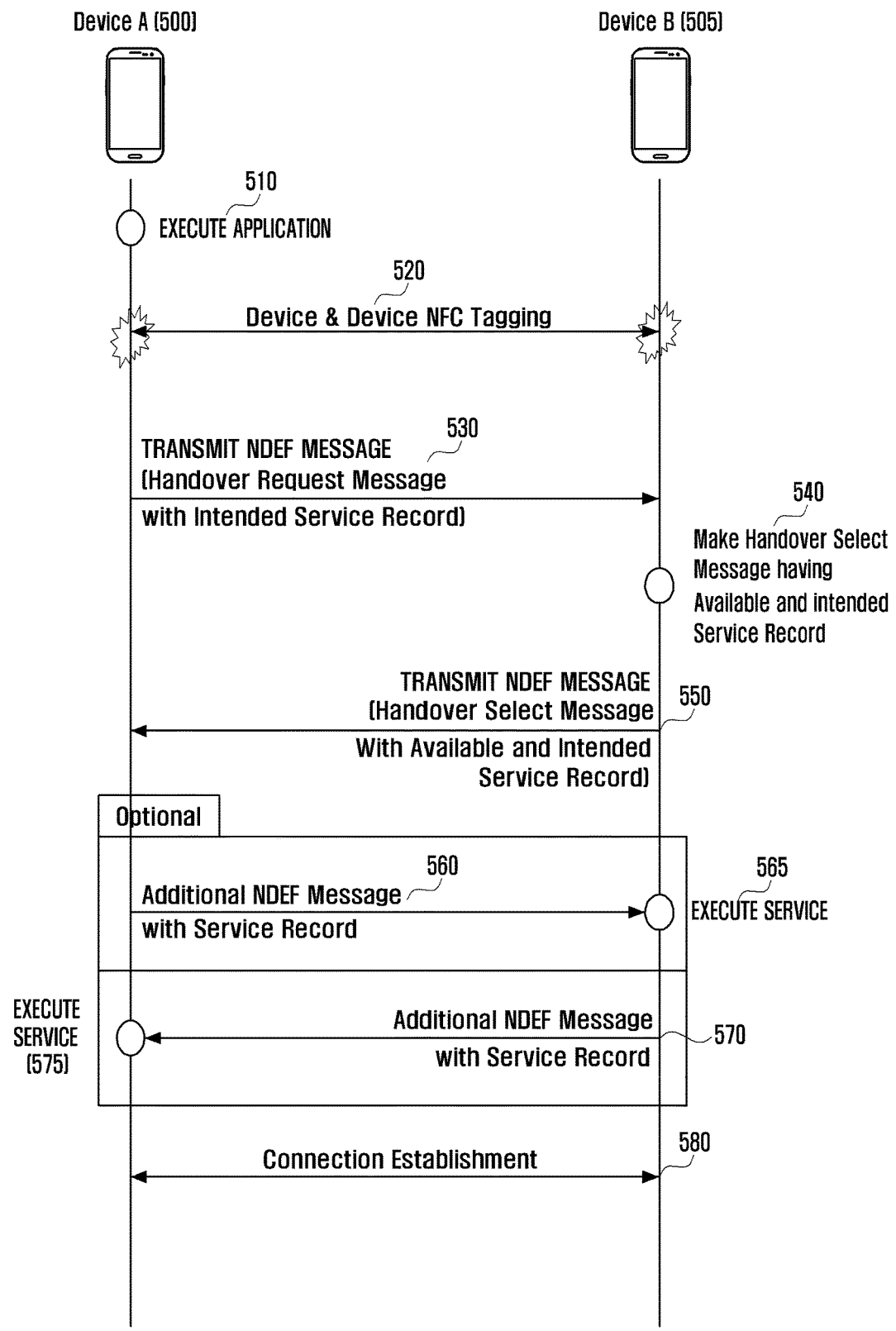
FIG. 5 is a flowchart of a service negotiation process according to an embodiment of the present disclosure.

FIG. 5 is a flowchart of a service negotiation process according to an embodiment of the present disclosure.

Referring to FIG. 5, service negotiation between a device A 500 and a device B 505 is performed.

Operations 510, 520, 530, 540, and 550 of FIG. 5 are the same as/similar to the operations 410, 420, 430, 450, and 460 of FIG. 4, and detailed descriptions thereof will be omitted herein.

Additional/operational messages (e.g., NDEF messages) may be transmitted/received in operations 560 and 570, service particulars may be determined accordingly, and services may be performed in operations 565 and 575.

Assuming, for example, that a service has been determined through the process until operation 550, but particulars regarding which a device will play what role, or details of the service have not been fully determined, a message of operation 560 and/or a message of operation 570 may be used to transmit/receive and confirm information regarding the role of each device. The message of operation 560 and/or the message of operation 570 may have a format similar to that of the message of FIG. 2 and FIG. 3.

In another example, services requested (preferred) by the device A 500 and the device B 505 may differ from each other, and a service to be performed may not be determined through the process until operation 550. In this case, a service may be determined based on the message of operation 560 and/or the message of operation 570. The service may be terminated when the service is impossible or when service execution is inappropriate.

When the service is continuously maintained, connection is established in operation 580, and, thereafter, the service may proceed according to service information exchanged through the messages until operation 570.

Figure 6:
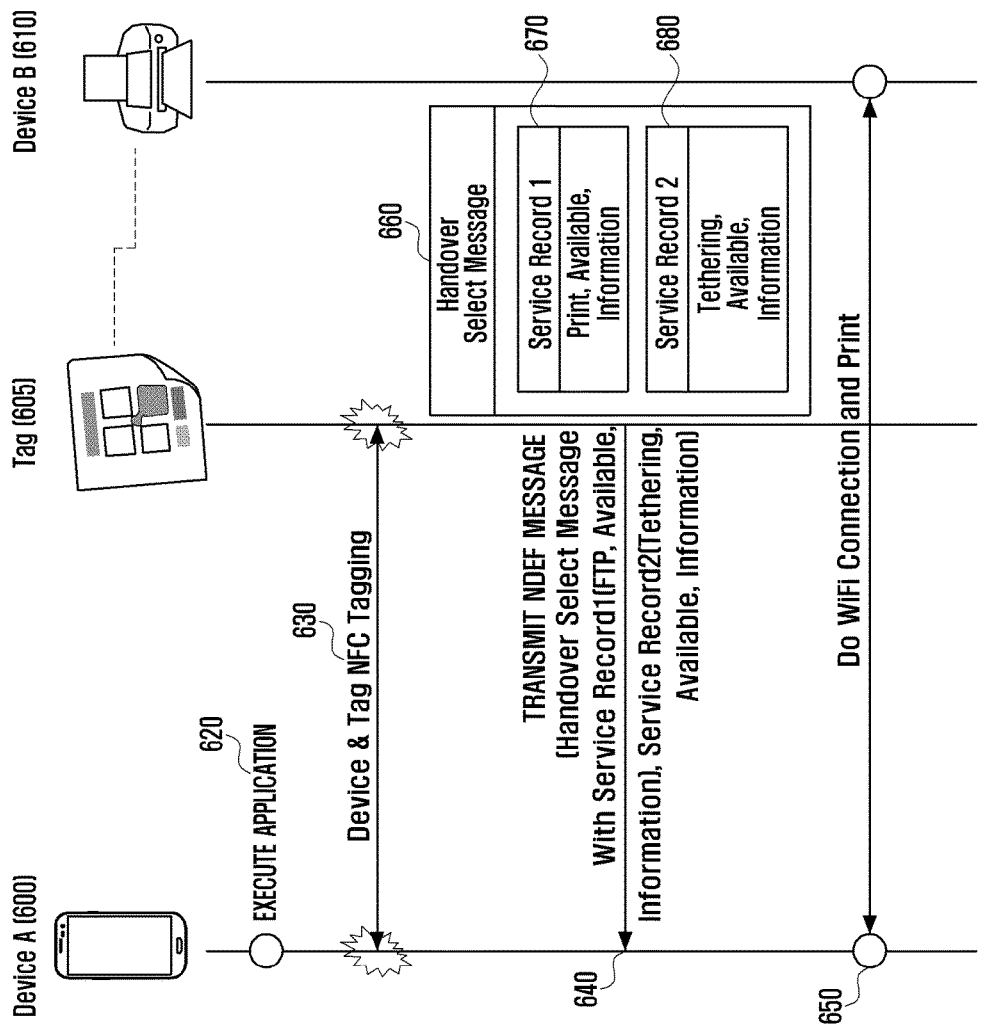
FIG. 6 is a flowchart of a service negotiation process according to an embodiment of the present disclosure.

FIG. 6 is a flowchart of a service negotiation process according to an embodiment of the present disclosure.

Referring to FIG. 6, a system including a device A 600, a tag 605, and a device B 610 is illustrated. The tag 605 has information regarding services, which the device B 610 can provide, recorded therein, and the information is not dynamically changed.

In operation 620, the device A 600 executes a first application. It will be assumed that the first application is an application for performing printing.

In operation 630, the device A 600 and the tag 605 performs NFC tagging.

In operation 640, the tag 605 transmits a (handover) selection message 660 to the device A 600. As an actual scheme, the device A 600 may actively read content stored in the tag 605. The selection message 660 includes, for example, two service records 670, 680. The first service record 670 includes an identifier (service name) of the printing service, the service type field (available type), and service information necessary for the printing service. The second service record 680 includes an identifier (service name) of a tethering service, the service type field (available type), and service information necessary for the tethering service. That is, the tag 605 transmits a selection message indicating that the device B 610 can perform the printing service and the tethering service.

The device A 600 may receive and analyze the information of the tag 605 and grasp that printing and tethering services are available in connection with the device B 610. In operation 650, since the device B 610 supports the printing service, which is desired by the device A 600, the device A 600 performs WiFi and/or Bluetooth connection with the device B 610 and, after the connection, automatically performs printing operation (see operation 650). The device A 600 may perform printing according to the first service record 670 among the information received in operation 640.

If NFC tagging is conducted while no specific application is being executed, the device A 600 may receive content of the first service record 670 and the second service record 680, which are stored in the tag 605, and display a part of information of the service records. That is, a list of available services may be displayed. The list of available services may include, for example, service names and information, which the user can grasp easily, among information associated with corresponding services.

Figure 7:
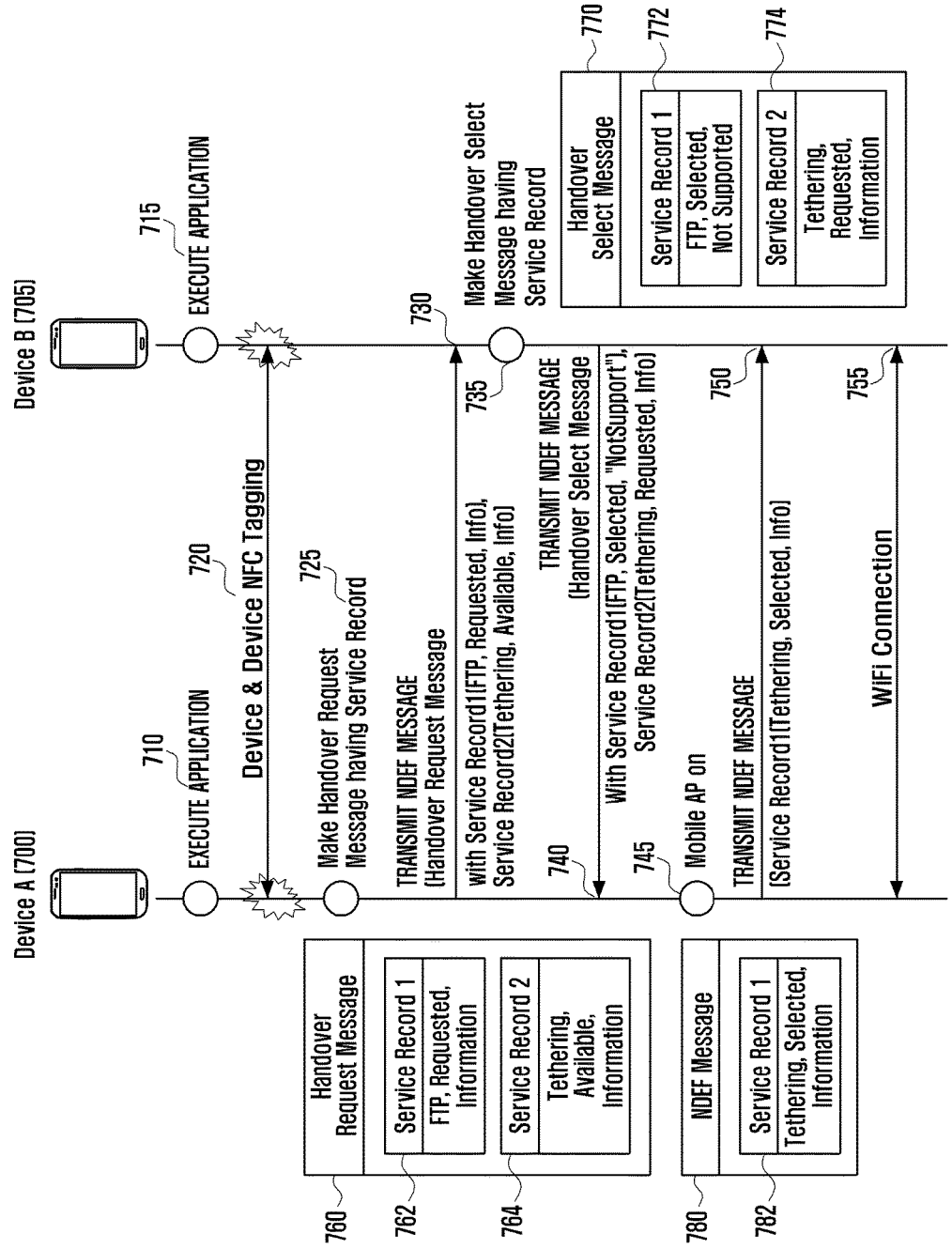
FIG. 7 is a flowchart of a service negotiation process according to an embodiment of the present disclosure.

FIG. 7 is a flowchart of a service negotiation process according to an embodiment of the present disclosure.

Referring to FIG. 7, a system including a device A 700 and a device B 705 is illustrated.

Further, referring to FIG. 7, operation 710, in which the device A 700 executes a first application, is illustrated. In operation 715, the device B 705 executes a second application. As will be described later, an application requested/supported by the first application and an application requested/supported by the second application have some differences.

In operation 720, NFC tagging between the device A 700 and the device B 705 is performed.

In operation 725, the device A 700 generates a (handover) request message 760 and, in operation 730, transmits the (handover) request message 760 to the device B 705. The (handover) request message 760 includes a first service record 762 and a second service record 764. The first service record 762 has a service name set as "FTP" and a service type set as the requested type and includes information related to a FTP service. The second service record 764 has a service name set as "tethering" and a service type set as the available type and includes information related to a tethering service. That is, the request message 760 includes information indicating that the device A 700 requests the FTP service and can support the tethering service.

In operation 735, the device B 705 generates a (handover) selection message (response message) 770 corresponding to the (handover) request message 760 and, in operation 740, the device B 705 transmits the generated selection message 770 (e.g., an NDEF message) to the device A 700. The selection message 770 includes a first service record 772 and a second service record 774. The device B 705 does not support the FTP service, and requests (prefers) the tethering service. Accordingly, the first service record 772 has a service name set as "FTP" and a service type set as the selected type and includes an indicator ("Not Supported") indicating that the corresponding service is not supported. The corresponding indicator may be implemented in the format of a service information TLV. The second service record 774 has a service name set as "tethering" and a service type set as the requested type and includes information related to the tethering service.

In operation 745, the device A 700 turns on a mobile Access Point (AP). It is determined, based on the message received from the device B 705, that the device B 705 does not provide the FTP service but requests the tethering service, and the access point is turned on to provide the tethering service accordingly.

In operation 750, the device A 700 transmits a selection message 780 (e.g., an NDEF message) to the device B 705. The selection (NDEF) message 780 includes a service record 782, and the service record 782 includes indication information, which indicates selection of the tethering service as described above, and information related to the tethering service.

In operation 755, connection is established, and the tethering service is executed as determined through the process of selection.

Figure 8:
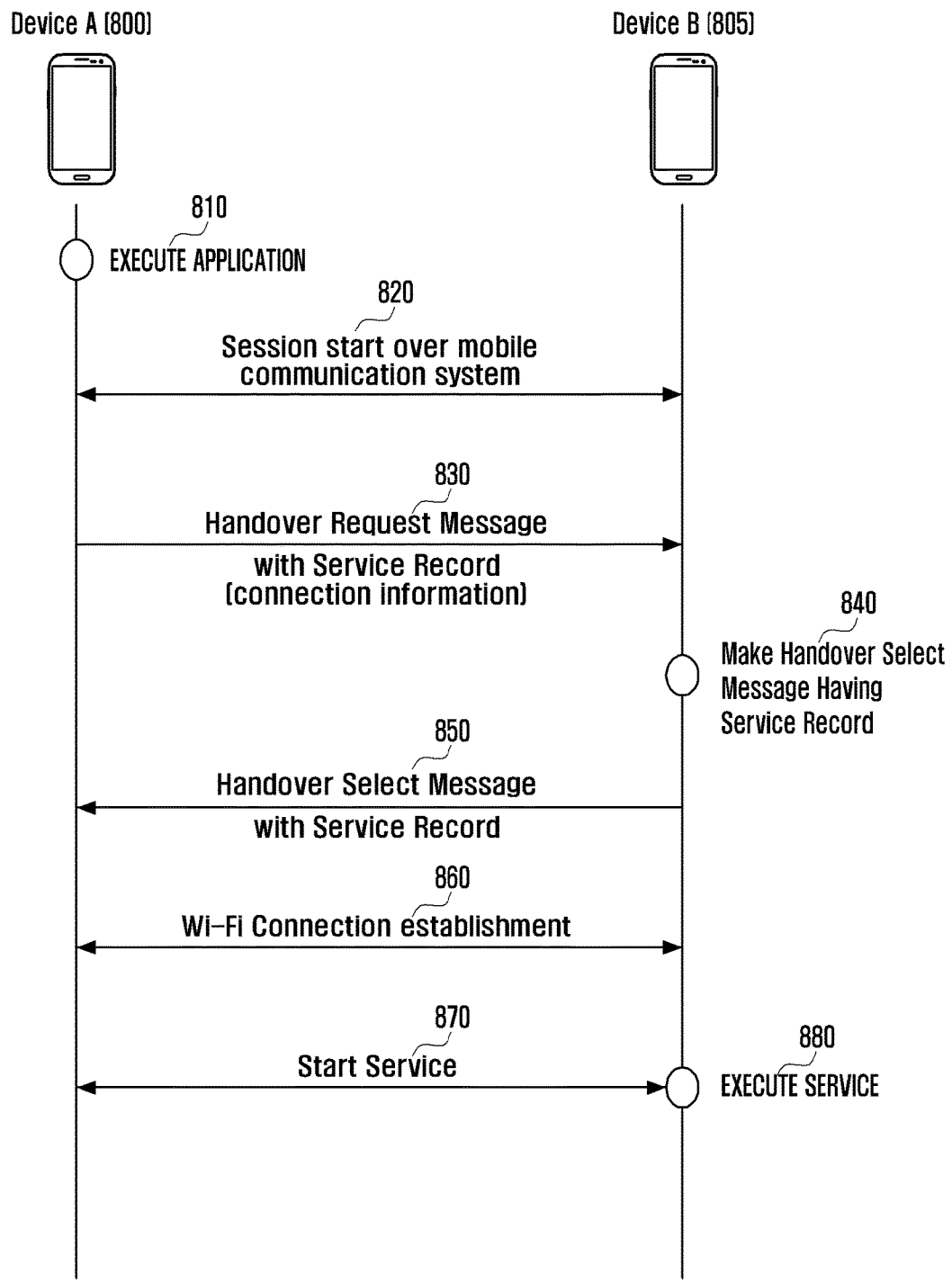
FIG. 8 is a flowchart of a service negotiation process according to an embodiment of the present disclosure.

FIG. 8 is a flowchart of a service negotiation process according to an embodiment of the present disclosure.

Referring to FIG. 8, a service negotiation between a device A 800 and a device B 805 is illustrated.

In operation 810, the device A 800 executes an application. The corresponding application may be executed by means of the user's input, or arrival of a preset time, booting of a device and/or other events.

In operation 820, a session for communication between the device A 800 and the device B 805 starts on a mobile communication system. In this case, the session may be started using a messenger program and a Short Message Service (SMS). In addition, the mobile communication system may be a system based High Speed Downlink Packet Access (HSDPA) of 3GPP, High Speed Uplink Packet Access (HSUPA), LTE, or Advanced E-UTRA (also referred to as LTE-A). Those skilled in the art can understand that the mobile communication system may be any other communication system having a similar technological background and channel type and, without greatly escaping from the scope of the present disclosure, may be a variant of the communication system.

In operation 830, the device A 800 transmits a (handover) request message to the device B 805 through the session started at operation 810. The request message may include information for Wi-Fi connection and service information.

In an embodiment, the request message may have a format the same as or similar to the configuration of FIG. 3. Carrier records 350, 365 may include the information for Wi-Fi connection, and service records 354, 360, 370, 376 may include the service information. The service type field 262 of a payload of a first service record included in the request message is set to indicate the requested type, and the payload of the first service record includes information regarding service items requested by the device A 800. The service type field 262 of a payload of a second service record included in the request message is set to indicate the available type, and the payload of the second service record includes information regarding service items that can be supported (available) by the device A 800.

In operation 840, a handover (select) message having a service record is generated. When the (handover) request message of operation 830 includes a service record having the requested type as its service type (request record), the device B 805 may select a service item, which can supported by the device B 805, from service items requested in the request record and transmit a selection message to the device A 800. In this case, the service name of the service record of the selection message may be set to be the same as the service name of the request record delivered at operation 830. The service type of the service record of the selection message may be set to indicate the selected type. The selection message may include information regarding whether the requested service can be executed or not and other relevant information necessary for service execution.

In addition, the device B 805 may separately have a service (preferred service) that it wants to request according to the user's setting, other events, etc. When a service record (available record) having the available type as its service type exists in the request message transmitted by the device A 800, the device B 805 may add information regarding the service it wants to request to a transmission target service record and set the service type of the transmission target service record to indicate the requested type. The device B 805 may set the service type of the service record to indicate the requested type, generate a service record including information regarding the service it wants to request, and transmit a selection message including the corresponding service record to the device A 800.

When user identification is necessary in operation 840, the device B 805 may request user identification. The handover message may be generated before, after, or concurrently with completion of user identification. In addition, the handover selection message may further include information indicating whether user is identified or not.

When a communication module for Wi-Fi is deactivated in operation 840, the device B 805 may activate the communication module. The handover message may be generated before, after, or concurrently with activation of the communication module, and the communication module may be activated before, after, or concurrently with the completion of user identification.

In an embodiment, the device B 805 may activate the communication module when the request message transmitted in operation 830 includes information indicating a request for switching of the communication module to an activated state.

In an embodiment, the device B 805 may activate the communication module when an activation request message including information indicating a request for switching of the communication module to an activated state is received. In an embodiment, the device A 800 may transmit the activation request message to the device B 805.

In operation 850, the device B 805 transmits the handover selection message, which has been generated in operation 840, to the device A 800. The handover selection message may further include information indicating whether the user is identified or not.

In operation 860, the device A 800 and the device B 805 establish Wi-Fi connection based on information exchanged in the above-described operations. A service after connection may be executed based on information exchanged through the above-mentioned service records in operations 870 and 880 (e.g., a start service operation and an execute service operation).

Examples of messages transmitted/received in FIG. 8 are given below:

Operation 830: a device A transmits a message; the service record is as given below:
Service name: FTP service
Service type: requested type
Service information TLV: "Wants to be a server, my connection information is . . . "

A device B receives the message of operation 830, and transmits a message in operation 850; the service record is as given below:
Service name: FTP service
Service type: selected type
Service information TLV: "Good. Available. Will connect."

Through the above-described process, an operation, e.g. FTP connection between two devices 800, 805 can be executed automatically.

Figure 9:
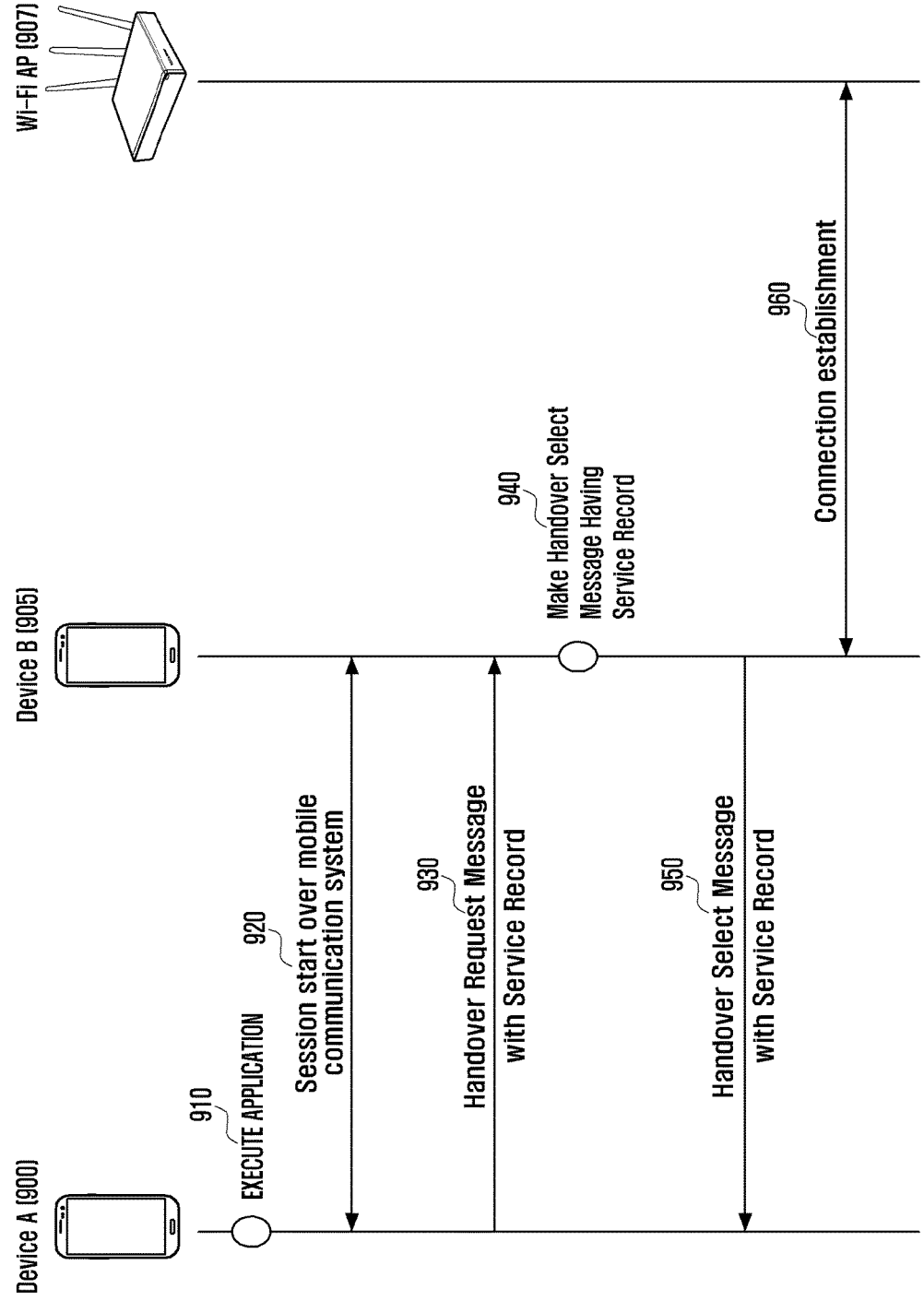
FIG. 9 is a flowchart of a service negotiation process according to an embodiment of the present disclosure.

FIG. 9 is a flowchart of a service negotiation process according to an embodiment of the present disclosure.

Referring to FIG. 9, a service negotiation between a device A 900 and a device B 905 is illustrated.

In operation 910, the device A 900 executes an application. The corresponding application may be executed by means of the user's input, or arrival of a preset time, booting of a device and/or other events.

In operation 920, a session for communication between the device A 900 and the device B 905 starts on a mobile communication system. In this case, the session may be started using a messenger program and a SMS. In addition, the mobile communication system may be a system based on HSDPA of 3GPP, HSUPA, LTE, or Advanced E-UTRA (also referred to as LTE-A). Those skilled in the art can understand that the mobile communication system may be any other communication system having a similar technological background and channel type and, without greatly escaping from the scope of the present disclosure, may be a variant of the communication system.

In operation 930, the device A 900 transmits a (handover) request message to the device B 905 through the session started at operation 910. The request message may include Wi-Fi AP connectivity information for Wi-Fi connection and service information. The Wi-Fi AP connectivity information may be connectivity information regarding a Wi-Fi AP 907 in a local area of a peer device for Wi-Fi connection, and the device B 905 may be a peer device.

In an embodiment, the request message may have a format the same as or similar to the configuration of FIG. 3. Carrier records 350, 365 may include the Wi-Fi AP connectivity information, and service records 354, 360, 370, 376 may include the service information. The service type field 262 of a payload of a first service record included in the request message is set to indicate the requested type, and the payload of the first service record includes information regarding service items requested by the device A 900. The service type field 262 of a payload of a second service record included in the request message is set to indicate the available type, and the payload of the second service record includes information regarding service items that can be supported (available) by the device A 900.

In operation 940, a handover (select) message having a service record is generated. When the request message of operation 930 includes a service record having the requested type as its service type (request record), the device B 905 may select a service item, which can be supported by the device B 905, from service items requested in the request record and transmit a selection message to the device A 900. In this case, the service name of the service record of the selection message may be set to be the same as the service name of the request record delivered at operation 930. The service type of the service record of the selection message may be set to indicate the selected type. The selection message may include information regarding whether the requested service can be executed or not and other relevant information necessary for service execution.

In addition, the device B 905 may separately have a service (preferred service) that it wants to request according to the user's setting, other events, etc. When a service record (available record) having the available type as its service type exists in the request message transmitted by the device A 900, the device B 905 may add information regarding the service it wants to request to a transmission target service record and set the service type of the transmission target service record to indicate the requested type. The device B 905 may set the service type of the service record to indicate the requested type, generate a service record including information regarding the service it wants to request, and transmit a selection message including the corresponding service record to the device A 900.

When user identification is necessary in operation 940, the device B 905 may request user identification. The handover message may be generated before, after, or concurrently with completion of user identification. In addition, the handover selection message may further include information indicating whether user is identified or not.

When a communication module for Wi-Fi is deactivated in operation 940, the device B 905 may activate the communication module. The handover message may be generated before, after, or concurrently with activation of the communication module, and the communication module may be activated before, after, or concurrently with the completion of user identification.

In an embodiment, the device B 905 may activate the communication module when the request message transmitted in operation 930 includes information indicating a request for switching of the communication module to an activated state.

In an embodiment, the device B 905 may activate the communication module when an activation request message including information indicating a request for switching of the communication module to an activated state is received. In an embodiment, the device A 900 may transmit the activation request message to the device B 905.

In operation 950, device B 905 transmits the handover selection message, which has been generated in operation 940, to device A 900. The handover selection message may further include information indicating whether the user is identified or not.

In operation 960, the device B 905 establishes Wi-Fi connection with the Wi-Fi AP 907 based on information exchanged in the above-described operations.

The device A 900 and the device B 905 may execute a service using the Wi-Fi connection established in operation 960 based on information exchanged through the above-mentioned service records.

Examples of messages transmitted/received in FIG. 9 are given below:

Operation 930: a device A transmits a message; the service record is as given below:
Service name: FTP service
Service type: requested type
Service information TLV: "Wants to be a server, my connection information is . . . "

A device B receives the message of operation 930, and transmits a message in operation 950; the service record is as given below:
Service name: FTP service
Service type: selected type
Service information TLV: "Good. Available. Will connect."

Through the above-described process, an operation, e.g. FTP connection between two devices 900, 905 can be executed automatically on the Wi-Fi connection established in operation 960.

Figure 10:
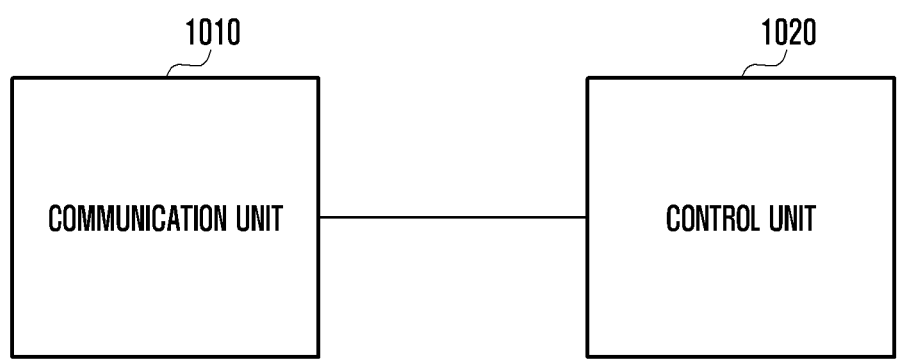
FIG. 10 is a block configuration diagram of an electronic device of service negotiation according to an embodiment of the present disclosure.

FIG. 10 is a block configuration diagram of an electronic device of service negotiation according to an embodiment of the present disclosure.

Referring to FIG. 10, an electronic device of service negotiation may include, for example, a communication unit 1010 and a controller 1020 (e.g., a control unit) is illustrated. The communication unit 1010 can transmit/receive signals required in at least some of the above-described embodiments. Specifically, the communication unit 1010 may include an NFC communication module for NFC connection and data transmission/reception through NFC and a WiFi communication module for WiFi connection and data transmission/reception through WiFi. Instead of the WiFi communication module, a Bluetooth communication module for Bluetooth connection and data transmission/reception through Bluetooth may also be used. It is also possible to simultaneously use a WiFi communication module and a Bluetooth communication module. The controller 1020 is configured to control each component unit of the electronic device so that the electronic device operates according to at least some of the above-described embodiments. According to an embodiment that requires user input, the electronic device may further include an input unit such as a touch sensor and/or a key input unit. According to an embodiment that needs to provide the user with visual information, furthermore, the electronic device may further include a display unit configured to provide the user with visual information. The electronic device may operate according to description regarding one of the devices 400, 405, 500, 505, 600, 610, 700, 705, 800, 805, 900, 905 in the above-described embodiments. However, the electronic device may operate based on a scheme of one of the two communication devices according to the situation. For example, the electronic device may operate in the same scheme as the device A 400, when an application inside the electronic device is executed, and operate in the same scheme as the device B 405, when there is no application execution.

The message formats described with reference to FIG. 2 to FIG. 10 are exemplary only, and each message has only to include information needed to transmit/receive the message. In this case, NFC tagging may be replaced with a discovery or sensing process according to a first protocol. Specifically, respective messages are classified into the requested type/available type and the selected type, and characteristics of each type have been described above in connection with service records. Respective messages need not have the same fields as in FIG. 2 and FIG. 3, as long as they can be classified into the requested type/available type and the selected type.

According to the above-mentioned process, the electronic device can perform NFC communication adequately after NFC tagging and exchange information necessary for service execution after following connection (WiFi/Bluetooth connection). Such messages may include requested type, set type, and available type messages. Specifically, the electronic device can avoid WiFi/Bluetooth connection, when no service can be executed after following connection (WiFi/Bluetooth connection), and thereby avoid waste of resources. In addition, the above-described process is performed automatically, which relieves the user of the inconvenience of manually conducting separate service execution after WiFi connection through NFC.

It has been assumed in the above-described embodiments that the primary connection protocol is NFC, and the secondary connection protocol is WiFi/Bluetooth. However, the scope of the present disclosure is not limited thereto, and can also be applied to a case in which the primary connection protocol is used for secondary connection.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

Those skilled in the art can appreciate that it is possible to implement the present disclosure in another specific form without changing the technical idea or the indispensable characteristics of the present disclosure. Accordingly, it should be understood that the embodiments described above are merely exemplary and are not limited. The scope of the present disclosure is defined by the appended claims to be described later, rather than the detailed description. Accordingly, it should be appreciated that all modifications or variations derived from the meaning and scope of the appended claims and their equivalents are included in the range of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of service negotiation by a first device, the method comprising:
   detecting a second device using a first protocol;
   transmitting, to the second device using the first protocol, a message comprising first indication information indicating that the first device seeks to use a first service and second indication information indicating that the first device provides a second service, the first service and the second service to be executed using a second protocol;
   identifying, whether a first selection message or a second selection message is received from the second device using the first protocol, wherein the first selection message comprises indication information indicating that the first service is supported by the second device, and wherein the second selection message comprises indication information indicating that the first service is not supported and indication information requesting the second service;
   establishing a connection with the second device using the second protocol for executing the first service or the second service, when the first selection message or the second selection message is received from the second device using the first protocol; and
   executing the first service with the second device when the first selection message is received, or the second service with the second device when the second selection message is received, based on the connection using the second protocol.

2. The method of claim 1, further comprising:
   transmitting, when the second selection message is received from the second device using the first protocol, a third selection message comprising indication information selecting the second service to the second device using the first protocol.

3. The method of claim 1,
   wherein the method further comprises at least one of transmitting additional information regarding the first service to the second device and receiving the additional information from the second device, when the first selection message comprising the indication information selecting the first service is received from the second device using the first protocol, and
   wherein the executing of the first service with the second device further comprises executing the first service with the second device using first service related information and the additional information.

4. The method of claim 1, wherein, when a communication device included in the second device is deactivated, the message includes information for requesting a switch of the communication device to an activated state.

5. The method of claim 1,
   wherein the message, the first selection message, and the second selection message each comprise connection information for a connection using the second protocol, and
   wherein the establishing of the connection further comprises establishing the connection with the first device using the second protocol based on the connection information.

6. A method of service negotiation by a second device, the method comprising:
   detecting a first device using a first protocol;
   receiving from the first device using the first protocol when the second device is tagged with a tag attached to the first device, a message comprising at least one of first indication information indicating that the first device seeks to use a first service and second indication information indicating that the first device provides a second service, the first service and the second service to be executed using a second protocol;
   establishing a connection with the first device using the second protocol, when service execution is determined based on the first indication information and the second indication information in the message;
   determining one service of the first service and the second service which is selected by the second device from services that are provided by the first device; and
   executing the determined service based on the connection using the second protocol.

7. The method of claim 6, wherein, when a communication device included in the second device is deactivated, the message includes information for requesting a switch of the communication device to an activated state.

8. The method of claim 6,
   wherein the message comprises connection information for a connection using the second protocol, and
   wherein the establishing of the connection further comprises establishing the connection with the first device using the second protocol based on the connection information.

9. A first device of service negotiation, the first device comprising:
   a communication device configured to:
      detect a second device using a first protocol,
      transmit, to the second device using the first protocol, a message comprising first indication information indicating that the first device seeks to use the first service and second indication information indicating that the first device provides a second service, and a second protocol being used for executing the first service and the second service; and
   at least one processor configured to:
      identify, whether a first selection message or a second selection message is received from the second device using the first protocol, wherein the first selection message comprising indication information indicating that the first service is selected by the second device, and wherein the second selection message comprises indication information indicating that the first service is not supported and indication information requesting the second service, establish a connection with the second device using the second protocol for executing the first service or the second service, when the first selection message or the second selection message is received from the second device using the first protocol, and execute the first service with the second device when the first selection message is received, or the second service with the second device when the second selection message is received, based on the connection using the second protocol.

10. The first device of claim 9, wherein the at least one processor is further configured to:
control, when the second selection message is received from the second device using the first protocol, the communication device to transmit a third selection message comprising indication information selecting the second service to the second device using the first protocol.

11. The first device of claim 9, wherein the communication device is further configured to further perform at least one of a function of transmitting additional information regarding the first service to the second device and a function of receiving the additional information from the second device, when the first selection message comprising the indication information selecting the first service is received from the second device using the first protocol, and wherein the at least one processor is further configured to execute the first service with the second device using first service related information and the additional information.

12. The first device of claim 9, wherein, when a communication device included in the second device is deactivated, the message includes information for requesting a switch of the communication device to an activated state.

13. The first device of claim 9, wherein the message, the first selection message, and the second selection message each comprise connection information for a connection using the second protocol, and wherein the at least one processor is further configured to establish the connection with the first device using the second protocol based on the connection information.

14. A second device of service negotiation, the second device comprising:

a communication device configured to:
detect a first device using a first protocol, and
receive a message from the first device using the first protocol when the second device is tagged with a tag attached to the first device, the message comprising at least one of first indication information indicating that the first device seeks to use a first service and second indication information indicating that the first device provides a second service, the first service and the second service to be executed using a second protocol; and at least one processor configured to:
establish a connection with the first device using the second protocol, when service execution is determined based on the first indication information and the second indication information in the message,
determine one service of the first service and the second service which is selected by the second device from services that are provided by the first device, and
execute the determined service based on the connection using the second protocol.

15. The second device of claim 14, wherein, if a communication device included in the second device is deactivated, the message includes information for requesting a switch of the communication device to an activated state.

16. The second device of claim 14, wherein a selection message is sensed from the tag, the selection message including an identifier of the first device, a type of service available from the first device, and service information of the first device.

17. The second device of claim 14, wherein the message comprises connection information for a connection using the second protocol, and wherein the at least one processor is further configured to establish the connection with the first device using the second protocol based on the connection information.

* * * * *